March 17, 1964  H. E. W. BURNSIDE  3,125,436
IRON ORE MAGNETIC ROAST PROCESS
Filed Jan. 11, 1960

Harvey E. W. Burnside Inventor

By Henry Berl

Patent Attorney

United States Patent Office 3,125,436
Patented Mar. 17, 1964

3,125,436
IRON ORE MAGNETIC ROAST PROCESS
Harvey E. W. Burnside, Locust, N.J., assignor to Esso Research and Engineering Company, a corporation of Delaware
Filed Jan. 11, 1960, Ser. No. 1,730
8 Claims. (Cl. 75—1)

The present invention relates to a process for beneficiation of iron ore, particularly to the reduction of hematite ($Fe_2O_3$) to magnetite ($Fe_3O_4$). The technique of the process involves the use of large amounts of steam for diluting reducing gas, and in a preferred modification involves the use of steam with a volatile hydrocarbon distillate in forming a steam-reducing gas mixture used in cooling the roasted ore following preheating and reducing of the ore.

There has been considerable attention given to the idea of roasting low grade nonmagnetic ores to form magnetic material which can be concentrated. Heretofore, from information available one kind of roasting process uses a rotary kiln or a fixed shaft type kiln in which ore particles are heated to elevated temperatures required for reducing $Fe_2O_3$ to $Fe_3O_4$ using a fuel gas, such as producer gas, mixed with recycled flue gas.

There are technical problems which arise in controlling the temperatures of the gases, their compositions, and their flow rates in various parts of the system. Among other things there are the problems of reducing fuel requirements, the availability of certain fuels at certain locations, and the amount of work required in the operation. Heat capacity and heat recovery are additional factors.

The present invention is adapted for the use of fuels different from the kinds used in described older methods. The present invention does not require expensive gas recirculating equipment and is more adapted to efficient control. For the present process, suitable equipment are rotary kilns and solids fluidization vessels which permit the finely divided ore solids to contact with gases in a high turbulent condition. In general, the ore fines or particles are made to travel through a heating zone wherein higher temperature combustion products of partly spent reducing gases preheat the ore, then through a reducing zone where the preheated ore is contacted with reducing gas having a high steam dilution and where the ore is at a temperature in the range of about 1100° to about 1500° F. Thereafter the magnetic ore produced in the reducing zone is cooled in a cooling zone where heat is transferred to steam-diluted gaseous CO and hydrocarbon mixture that undergoes reaction to form $H_2$ then flows to the reducing zone.

It is important that the conditions in the cooling zone and in the reducing zone be such as to prevent formation of ferrous oxide. It is also desirable for the same reason to obtain good uniform exchange and a fast cooling of the $Fe_3O_4$ bearing ore in the cooling zone. The process will be described in more detail with reference to the drawing which illustrates by flow diagrams preferred modifications.

Figure 1:
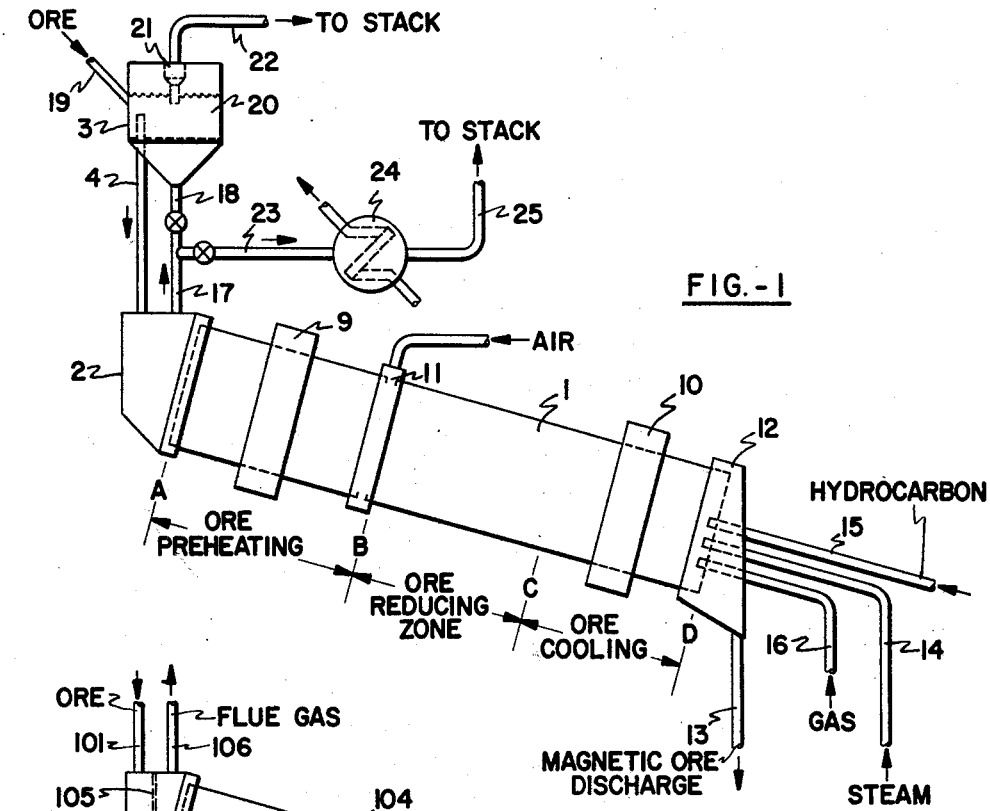
FIG. 1 shows a flow diagram of the process with use of a rotary kiln.

In the operation depicted by FIG. 1 crushed and sized hematite ore fines in the range of about 0.1 to 0.75 inch are fed to the upper end of rotary kiln 1 from solids feed hopper 2, which may receive the fines from a fluidized fines drier 3 by way of line 4.

The rotary kiln may be of conventional construction, e.g., a steel cylindrical shell lined with refractory and pitched at an angle, e.g., 15°, to the horizontal.

The ore fines entering the upper end of kiln 1 travel by gravity down to the lower discharge end of the kiln which is an inclined cylinder rotating on driving or supporting rings 9 and 10.

The ore fines first pass through a preheating section from kiln charge inlet A to combustion zone B to receive heat from countercurrently flowing hot combustion gas formed at B by burning of spent reducing gas with air or air plus added fuel from side injection burners 11. The fines preheated to the temperature necessary for reduction of $Fe_2O_3$ to $Fe_3O_4$, e.g., 1100° to 1500° F. continues travelling into the reducing section B—C where the ore fines contact steam-diluted reducing gas containing a major proportion of steam, i.e., more than about 50 volume percent of steam and containing $H_2$ as the principal reductant. The hot reduced ore ($Fe_3O_4$) on leaving the reducing zone toward discharge end D of the kiln are contacted with relatively cooler current of steam-diluted reducing gas passing countercurrently through the cooling zone C—D.

The reducing and cooling zones overlap in their functions in that a small part of the reduction occurs in the cooling zone until the ore temperature reaches a level at which reaction rate becomes negligible. Moreover, as pointed out, as the steam-diluted gaseous mixture entering the cold end of the kiln's cooling zone is heated and approaches the ore reducing zone, hydrocarbon and CO components of the mixture undergo reaction under conditions favoring formation of $H_2$ and $CO_2$. As the reduced ore continues to move toward the discharge end, it gives up heat to the steam-diluted gases, so that the ore containing $Fe_3O_4$ on being discharged into apron bin 12 is at a relatively low temperature, e.g., below 900° F., preferably below 750° F.

The magnetic iron oxide product is withdrawn by line 13 for further cooling and processing, e.g., grinding, magnetic separation, and briquetting or pelletizing in conventional manner.

Steam at 212° to 400° F. which can be obtained with heat recovered from gases leaving the upper end of the kiln is introduced by line 14 to serve as heat carrier and reactant with hydrocarbon and CO.

Hydrocarbon vapors, natural gas, or liquid hydrocarbons, e.g., naphtha or heating oil, is introduced by line 15 into the ore cooling zone C—D where the hydrocarbons undergo at least partial cracking and reforming with the steam to produce a gas containing $H_2$, $CO_2$, and some CO diluted by the steam in excess.

Other reducing gas, e.g., producer or water gas, may be injected from line 16, if desired.

The hydrocarbon from line 15 and steam from line 14 introduced into the cooling zone undergo reactions which involve cracking of the hydrocarbon accompanied by reaction with the steam to form $H_2$ and CO. The CO reacts with the excess steam to form more $H_2$ and $CO_2$. These reactions absorb heat but the net result is that the gas mixture becomes heated to a temperature desired in the zone where the $Fe_2O_3$ in the ore is reduced to $Fe_3O_4$. A special advantage which results from the cracking and reforming reactions in the cooling zone is the additional cooling of the ore which is obtained. Also use of the heat in the ore for this purpose improves the efficiency of fuel utilization over that of a process in which the fuel reformation and cracking is carried out in a separate reactor in the absence of ore. In the reducing zone part of the $H_2$ and CO react with the $Fe_2O_3$ and form $Fe_3O_4$, $H_2O$ and $CO_2$. In the combustion zone the residual hydrogen, CO and hydrocarbons are burned to $H_2O$ and $CO_2$ and the gas temperature is raised. Thus, the heated gas stream moving through the ore preheating zone gives up heat to the ore fines passing oppositely therethrough.

The hot gases leaving the upper end A of the kiln 1 are withdrawn through duct 17 at an elevated temperature in the range of about 300° to 600° F. A portion of these gases may be passed up through line 18 into the vessel 3 for preliminary light drying of the fresh ore fines fed into vessel 3 by line 19. These fines form a fluidized bed 20. Moisture and gases are removed from vessel 3 thorugh a fines separator, e.g., cyclone 21, and by line 22 to a flue gas stack.

All or most of the flue gas withdrawn from the kiln 1 by duct 17 may be passed by duct 23 to waste heat boiler 24 where heat is recovered to form steam sent to kiln 1. Residual flue gas is sent to a stack by duct 25.

Figure 2:
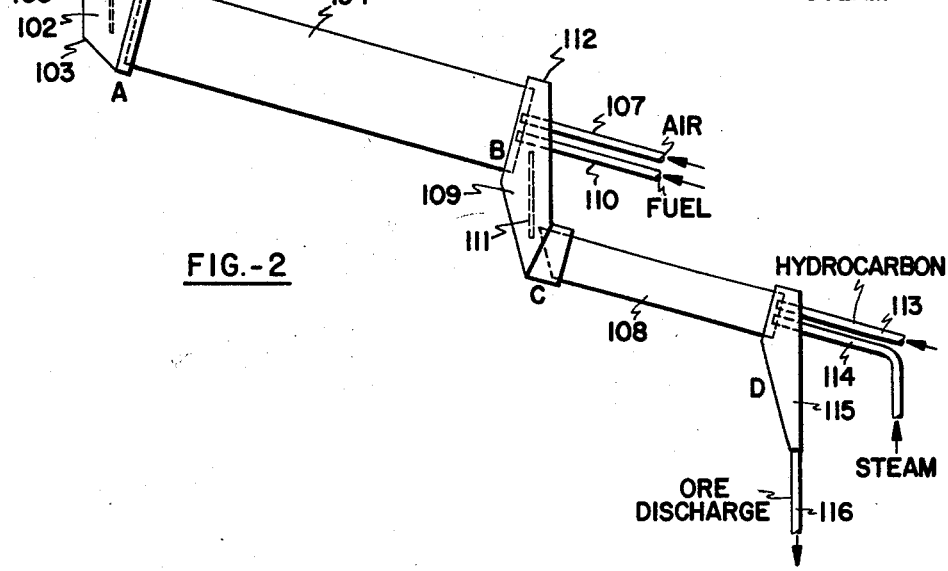
FIG. 2 shows a procedure in which the process is carried out in two stages with rotary kilns.

Instead of using a single kiln, as shown in FIG. 1, a dual kiln system may be used, as shown in FIG. 2, to obtain certain advantages.

In FIG. 2, the $Fe_2O_3$-bearing ore particles are supplied from a feed line 101 to a solids charging hopper 102 in housing 103 loading the ore into an upper large diameter kiln 104 continuously. Within the housing 103 a partition 105 forms a flue gas outlet so that flue gas flowing out from the upper end of kiln 104 can be removed through a duct 106. The housing 103 of hopper 102 and the flue gas outlet makes a gas-tight abutment or sliding-fit with the rotating kiln 104.

The $Fe_2O_3$ ore particles travel under the force of gravity from the solids inlet end A of the kiln 104 to the solids discharge end B countercurrently to gaseous combustion products formed by injecting compressed air from line 107 to burn combustible components of hot gas entering from the lower kiln 108 by way of duct 109 and any fuel added through line 110. Thus, a high temperature combustion zone is established in the vicinity of the solids discharge end B of upper kiln 104 to form said gaseous combustion products which preheat the $Fe_2O_3$ ore to the temperature needed for reduction, e.g., 1100° to 1500° F. These gaseous combustion products flowing toward the upper end A of kiln 104 are cooled as they impart heat to the $Fe_2O_3$ ore but remain at an elevated temperature, e.g., 300° to 600° F., when they are withdrawn as the flue gas through duct 106.

The preheated $Fe_2O_3$ ore fines discharged at end B of kiln 104 are made to pass through chute 111 into the solids receiving end C, i.e., the upper end, of rotary kiln 108. The chute 111 and the gas outlet duct of kiln 108 are enclosed in a housing 112 which makes a gas-tight abutment with the lower end 13 of kiln 104 and the upper end C of kiln 108.

As the high temperature $Fe_2O_3$ ore fines travel from end C of kiln 108 toward solids discharge end D of this kiln they are first contacted in a reducing zone by a hot gas mixture containing reducing components, e.g., $H_2$ and CO, mainly $H_2$, and residual hydrocarbons highly diluted by gaseous $H_2O$ and $CO_2$. This hot gaseous mixture results from reaction of gaseous or vaporized hydrocarbon injected by line 113 and steam injected by line 114 into the kiln 108 at its lower end D.

The steam and hydrocarbon injected into kiln 108 become heated to a cracking and reforming temperature, e.g., 900° to 1400° F., by heat they receive from the countercurrently moving ore in which $Fe_2O_3$ has been reduced to $Fe_3O_4$ near the upper part of kiln 108. In the reforming reaction, carbon of the hydrocarbon becomes oxidized to CO, which then reacts with $H_2O$ vapor to form $CO_2$ and $H_2$ under the conditions prevailing in a zone close to the reducing zone and in the reducing zone where some of the nascent hydrogen from decomposition of the hydrocarbon and reaction of the steam combines with oxygen of the $Fe_2O_3$ to form $H_2O$. The $Fe_2O_3$ is reduced to $Fe_3O_4$. In this reducing zone some of the nascent CO can also combine with oxygen of the $Fe_2O_3$ to form $CO_2$ and $Fe_3O_4$. However with a sufficiently high steam concentration in the gases passing through the reducing zone, e.g., for a reduction zone temperature of 1400° F. by making the partial pressure ratio of $H_2O/H_2$ above about 1.91 and of the $CO_2/CO$ above about 2.33, the $Fe_3O_4$ formed is prevented from becoming further reduced to FeO and Fe at the temperatures maintained in kiln 108.

The $Fe_3O_4$-bearing ore resulting from the reduction becomes cooled to a lower temperature, e.g., 300° to 750° F. by the time it reaches the discharge end D of kiln 108 where these solids descend into the apron chute 115 which has a gas-tight sliding fit with the rotating kiln 108. From chute 115 the $Fe_3O_4$ fines are drawn off through conduit 116 for recovery, e.g., magnetic separation, as mentioned with respect to FIG. 1.

A basic and distinctive feature of the present invention resides in the use of steam as a main gas diluent first through a cooling zone then through the reducing zone and ore preheating zones. The steam improves the heat capacity of the gases used in carrying heat through the kiln or kilns. This is a beneficial feature in several respects. The use of steam as the diluent rather than recycled flue gas permits a better control in minimizing the presence of free oxygen in the cooling zone, eliminates more costly and cumbersome equipment required for recycling flue gas, permits better heat recovery from the flue gas, and is more suitable for reaction with hydrocarbon in quenching the reduction reaction and in supplying the desired amount of reducing reactant.

In using steam as a vapor component of the gaseous mixture passed through the cooling zone for cooling and stabilizing the magnetic roast that leaves the reducing zone, relatively minor amounts of industrial reducing gas, e.g., water gas, producer gas, or the like may be injected with the steam.

Use of steam in cooling rather than flue gas has the advantage of eliminating problems which arise from the carrying of ash, tars, carbon, and corrosive substances ($SO_3$) such as may accumulate in a flue gas recycle system.

For illustration of the operating procedure the following examples are given.

EXAMPLE

A low grade hematite ore containing 30 to 35 wt. percent Fe taken as starting material to be upgraded to a magnetic roast product capable of concentration by magnetic separation to about 55 to 70 wt. percent Fe content is first crushed to form particles which pass through a ¾ inch square opening of a screen. The crushed and sized ore at a temperature of 100° F. is fed into the preheating section of a kiln where combustion product flue gas exits at 500° F. and is passed to a waste heat boiler for generating steam.

On the basis of 2240 lbs. ore feed per hour, the flue gas leaving the kiln at 500° F. is 335 cu. ft. per minute. More than 50% of this gas is $H_2O$ vapor.

The ore particles passing through the preheating section of the kiln become heated to 1400° F. by the combustion gases as the ore particles reach a zone where compressed air at 100° F. is blown into the kiln at sufficient rate to complete combustion of CO, $H_2$, and hydrocarbons in the residual gas from the reduction zone. Combustion is controlled to keep the combustion gases at 1500° to 1700° F. in the combustion zone and to have a small amount of $O_2$, e.g., less than 1%, in the flue gas leaving the kiln.

The ore particles, heated to 1400° F., are passed from the combustion zone of the kiln into a reducing zone for contact with steam diluted reducing gas that has been formed and preheated in the adjacent cooling zone. The gases enter the reducing zone from the cooling zone at 1300° F., i.e., after having absorbed heat from the reduced ore which is thereby cooled down to a temperature below about 800° F. for discharge.

The steam diluted hydrocarbon vapors injected into the roasted and reduced ore cooling zone undergo a decomposition that results in formation of $H_2$, $CO_2$, and minor amounts of CO, and since this reaction is endothermic and occurs mainly at the hot end of the ore cooling zone where the gases approach the reducing zone, there is rapid absorption of heat in this area.

By supplying heavy naphtha at the rate of 7.0 gal. per long ton with 250° F. steam at a rate of 200 lb. per long ton of reduced ore discharged a suitable reducing gas mixture is formed in the cooling zone.

For the type of operation described with the temperature and time provided for substantial cracking and reforming of the naphtha hydrocarbon feed, the gas compositions and quantities are shown in the following table.

*Table I*

GAS COMPOSITIONS AND QUANTITIES

[Basis: 1 long ton (LT). Naphtha feed (liquid)—7.0 gal./LT. Steam (250° F.)—200 lb./LT. Gas composition, vol. percent.]

|  | Reducing Gas | | Flue Gas—Kiln Outlet |
|---|---|---|---|
|  | Inlet | Outlet |  |
| $H_2$ | 29.3 | 14.5 |  |
| CO | 3.1 | 1.8 |  |
| $H_2O$ | 58.5 | 73.3 | 50.9 |
| $CO_2$ | 7.6 | 8.9 | 10.9 |
| Hydrocarbon | 1.5 | 1.5 |  |
| $O_2$ |  |  | 0.5 |
| $N_2$ |  |  | 37.7 |
| Cubic Feet/LT [1] | 18,600 | 18,600 | 41,000 |

[1] Calculated at conditions of 1 atm. and 1300° F. in reducing zone; 1500° F. and 1 atm. for flue gas.

Hydrocarbons present in large concentrations in a reducing gas entering the reducing zone can cause serious overreduction. The present invention takes advantage of the hydrocarbon cracking and reforming in a zone where the steam diluted hydrocarbon undergoes efficient conversion to gas which results mainly in steam diluted $CO_2$ and $H_2$. This gasification in the kiln can be up to 100% efficient and any residual hydrocarbon is well mixed and diluted.

Cost studies have shown that the gasification of hydrocarbons by reaction with steam in the kiln lowers the operating cost by as much as 40 to 50% compared to the cost of a process in which coke or mineral oil is gasified by partial combustion with air to produce the reducing gas outside the kiln in separate conventional equipment.

Although the process has been illustrated as conducted in rotary kilns, other forms of apparatus can be adapted for carrying out the process, such as fixed vertical kilns and fluidized solids techniques in which the ore fines are treated in stages using one continuously moving bed of ore solids or a number of fluidized beds, provision being made for use of large amounts of steam for diluting the oxidizable compounds, e.g., hydrocarbons and carbon monoxide and giving such a mixture an opportunity to undergo reaction and suitable mixing before the resulting gas mixture enters the ore reducing zone where temperatures are sufficiently high for rapid reducing action.

A small leakage of air may occur into the kiln where steam, hydrocarbon, and other gases for the reduction enter, but any such air present is negligible in amount with respect to the steam and total gas passed to the reducing zone. The negligible amount of oxygen in the air does not cause significant reoxidization of $Fe_3O_4$ and reacts with oxidizable gas components present.

The process described is adaptable to the use of various mineral hydrocarbon oil distillates, e.g., naphtha, kerosene, and the like for making the reducing gases with steam in removing heat from the reduced ore. Also, natural gas may be employed.

The invention described is claimed as follows:

1. In a process for reducing ferric oxide in low grade iron ore to produce magnetic ore, the improvement which comprises preheating particles of the low grade ore in a preheating zone at a temperature of about 300–1100° F. by contact with higher temperature steam-diluted combustion gases to a temperature at which $Fe_2O_3$ will be reduced by $H_2$ to $Fe_3O_4$ in a subsequent reducing zone, contacting the thus preheated ore in a reducing zone at a temperature of about 750–1500° F. with a hot gaseous mixture containing hydrogen as a predominant reducing reactant diluted with more than about 50 volume percent of steam, cooling resulting reduced ore having $Fe_2O_3$ converted to $Fe_3O_4$ by contact with a cooler gas mixture in a cooling zone at a temperature of below about 1100° F. where CO and hydrocarbon in said gas mixture are reacted with steam to form $CO_2$ and $H_2$ mixed with more than about 50 volume percent of steam, passing reducing gas at least in part produced in said cooling zone mixed with steam from said cooling zone to said reducing zone, passing steam-diluted partly oxidized reducing gas from said reducing zone to a combustion zone where oxygen-containing gas is added for combustion to form said higher temperature steam-diluted combustion gases contacted with the low grade ore in the preheating zone.

2. A method according to claim 1 wherein said hot gaseous mixture containing hydrogen as a predominant reducing reactant diluted by a high proportion of steam has, at a temperature of about 1400° F, a partial pressure ratio of $H_2O/H_2$ above about 1.91, and a partial pressure ratio of $CO_2/CO$ above about 2.33.

3. The process of claim 1 wherein substantially all of said reducing gas is formed in said cooling zone by feeding to said cooling zone about 7.0 gallons of liquid hydrocarbons per long ton of reduced ore and steam at about 250° F. at a rate of about 200 pounds per long ton of reduced ore, wherein said liquid hydrocarbon is reformed to $CO_2$, CO and $H_2$ gas products.

4. In a process of roasting $Fe_2O_3$ ore particles under reducing conditions to convert the $Fe_2O_3$ to magnetic $Fe_3O_4$ in said particles, the steps which comprise passing the $Fe_2O_3$ ore particles through a preheating zone of a temperature of about 300–1100° F. to a gas combustion zone, heating said particles thus being passed continuously by countercurrent higher temperature stream of steam-diluted combustion gases from said combustion zone to a temperature in the range of 1100° to 1600° F., passing the thus preheated ore particles through a reducing zone at a temperature of about 900–1500° F. countercurrently to a reducing gas mixture containing more than about 50 volume per cent of steam, passing the reducing gas mixture in which part of its reducing components is oxidized by the $Fe_2O_3$ to said combustion zone where said higher temperature steam-diluted combustion gases are formed, passing the ore particles containing magnetic $Fe_3O_4$ from said reducing zone through a cooling zone of a temperature of below about 1100° F. to an end of said zone where the particles are discharged, introducing from said discharge end of the cooling zone steam and volatile hydrocarbon to form a gas mixture containing more than about 50 volume percent of steam flowing countercurrently to the reduced ore particles, raising the temperature of said gas mixture as it flows to the reducing zone to a temperature in the range of 1000° to 1500° F. by the heat said gas mixture receives in cooling the reduced ore particles so that volatile hydrocarbon in said gas mixture undergoes reforming to $CO_2$ and $H_2$ gas products in the presence of more than about 50 volume percent of steam.

5. A process for converting particles of nonmagnetic ore to magnetic ore by reduction of $Fe_2O_3$ to $Fe_3O_4$ in said particles, which comprises imparting a tumbling motion to the nonmagnetic ore particles as they are moved gravitationally from an upper cool end to a lower hot end of a preheating zone of a temperature of about 300–1600° F. countercurrently to higher temperature gases which directly heat said particles, discharging the heated ore particles from said lower hot end of the preheating zone into an upper hot end of a reducing zone of a temperature about 1100–1500° F. through which the ore particles as they undergo reduction move gravitationally in tumbling motion then through a cooling zone of a temperature of below that in said reducing zone to a lower particles discharge end of said cooling zone, supplying reducing gas reactants to said reducing zone in a gas mixture current that contains more than about 50 volume percent of steam raised in temperature by heat absorbed from the particles passing through said cooling zone countercurrently to the gas mixture current, passing gas which reaches said upper hot end of the reducing zone into the lower hot end of said preheating zone, admixing air with gases passsed into said hot end of the preheating zone for combustion of combustible components of said gases to form the higher temperature gases which directly heat the particles moved through the preheating zone.

6. A process for reducing nonmagnetic ore particles to magnetic particles containing $Fe_3O_4$, which comprises preheating the ore particles by contact with higher temperature gases, contacting the resulting preheated ore particles at a reducing temperature with a reducing gas mixture which contains more than about 50 volume percent of steam mixed with hydrogen and $CO_2$ in forming magnetic particles from the ore particles, and cooling the magnetic particles by contact with a lower temperature gas mixture containing steam mixed with hydrogen, CO, $CO_2$ and gaseous hydrocarbon in which part of the gaseous hydrocarbon and CO undergo conversion to $H_2$ and $CO_2$ to form the reducing gas mixture contacted with the preheated ore particles at a reducing temperature.

7. In a process for reducing $Fe_2O_3$ of nonmagnetic ore particles to $Fe_3O_4$ to make the particles suitable for magnetic separation, the steps which comprise contacting the ore particles at about 1100° to 1500° F. with reducing gas containing more than about 50 volume percent steam and in which $H_2$ is the principal reductant which reduces the $Fe_2O_3$ to $Fe_3O_4$ in a reducing zone and steam is the principal gas diluent in the reducing zone, passing resulting magnetic ore particles from the reducing zone into a successive cooler zone at a lower temperature than said reducing zone where heat is absorbed by a steam diluted reducing gas containing CO from the magnetic ore particles in effecting reaction of CO with the steam at 750° to 1500° F in producing $H_2$ and $CO_2$ as components of said gas current contacted with the ore particles in said reducing zone.

8. In a process for reducing $Fe_2O_3$ in hematite ore particles to $Fe_3O_4$ to make said ore particles magnetic the steps which comprise contacting the hematite particles with hot gas in a preheating zone, contacting resulting preheated hematite particles with steam-diluted reducing gas having $H_2$ as principal reductant in a reducing zone under conditions for reducing $Fe_2O_3$ to $Fe_3O_4$ to make the ore particles magnetic, contacting the magnetic ore particles in a succeeding cooler zone at a lower temperature than said reducing zone with steam-diluted reducing gas containing hydrocarbon and more than about 50 volume percent of steam under conditions for cracking and reforming a substantial part of the hydrocarbon with the steam to form said reducing gas having $H_2$ as principal reductant which is contacted with the hematite particles in said reducing zone.

References Cited in the file of this patent

UNITED STATES PATENTS

| | | |
|---|---|---|
| 2,204,576 | Davis | June 18, 1940 |
| 2,269,465 | Lykken | Jan. 13, 1942 |
| 2,503,555 | Lykken | Apr. 11, 1950 |
| 2,692,050 | Nelson | Oct. 19, 1954 |
| 2,693,409 | Stephens | Nov. 2, 1954 |
| 2,750,277 | Marshall | June 12, 1956 |
| 2,821,471 | Sellers | Jan 28, 1958 |
| 2,890,106 | Heath | June 9, 1959 |
| 2,953,450 | Viles | Sept. 20, 1960 |
| 2,977,216 | Whaley | Mar. 28, 1961 |
| 2,990,269 | Hyde | June 27, 1961 |